United States Patent [19]

Lee

[11] Patent Number: 5,285,062
[45] Date of Patent: Feb. 8, 1994

[54] LASER/DETECTOR HYBRID WITH MIRROR SOURCE AND DIFFRACTED RETURN BEAM

[75] Inventor: Wai-Hon Lee, Cupertino, Calif.

[73] Assignee: Hoetron, Inc., Sunnyvale, Calif.

[21] Appl. No.: 868,751

[22] Filed: Apr. 14, 1992

[51] Int. Cl.$^5$ ............................................. G11B 7/00
[52] U.S. Cl. .................................. 250/216; 250/239; 369/44.14
[58] Field of Search ................. 250/214.1, 239, 208.2, 250/216; 257/433, 699; 369/112, 44.23, 44.14; 372/36, 43

[56] References Cited

U.S. PATENT DOCUMENTS

| | | | |
|---|---|---|---|
| 4,437,177 | 3/1984 | Watabe et al. ........................ | 369/45 |
| 4,669,073 | 5/1987 | Wakabayashi et al. ............... | 369/45 |
| 4,731,772 | 3/1988 | Lee .................................... | 369/44.14 |
| 4,772,784 | 9/1988 | Yoshitoshi et al. ............. | 250/216 X |
| 4,906,839 | 3/1990 | Lee ..................................... | 250/239 |
| 5,005,162 | 4/1991 | Mitsumori et al. ............. | 369/112 X |
| 5,062,098 | 10/1991 | Hori et al. ............................ | 369/112 |
| 5,111,448 | 5/1992 | Komma et al. ..................... | 369/44.23 |
| 5,136,424 | 8/1992 | Cox et al. ...................... | 369/44.23 X |
| 5,191,204 | 3/1993 | Dickson et al. ................... | 250/208.2 |

*Primary Examiner*—David C. Nelms
*Assistant Examiner*—John R. Lee
*Attorney, Agent, or Firm*—Townsend and Townsend Khourie and Crew

[57] ABSTRACT

The present invention provides a semiconductor laser and a photodetector on a supporting substrate. The supporting substrate is inserted into a housing with a 45 degree mirror for the purpose of redirecting the light emitting through the edge of the laser to propagate along the optical axis of the hybrid device. A hologram lens is mounted at the output end of the hybrid device to diffract the returned beam to the photosensitive ares of the detector without returning through the mirror.

11 Claims, 6 Drawing Sheets

LASER/DETECTOR HYBRID WITH MIRROR SOURCE AND DIFFRACTED RETURN BEAM

BACKGROUND OF THE INVENTION

The present invention relates to laser/detector hybrids for use in optical heads.

This inventor disclosed in U.S. Pat. No. 4,731,772 an optical head consisting of a laser/detector hybrid device and holographic optical elements forming an optical head for reading signals from an optical disc. FIG. 1 shows the hybrid device 68 of that invention. The laser diode is of the type that emits light from the edge of the laser chip. Laser chip 86 is mounted on one surface of a heatsink 88 parallel to the direction of propagation of the light beam (out of the page). A photodetector 90 is mounted on a second surface of the heatsink which is normal to the direction of propagation of the light beam. A power monitor 92 is located behind the laser chip 86.

This inventor also disclosed in U.S. Pat. No. 4,906,839 an improvement of the hybrid device in U.S. Pat. No. 4,731,772 by mounting a surface emitting laser chip 18 directly on the surface of a photodetector chip 22 to form a hybrid device 200 as shown in FIG. 2. The light beam emitted by a surface laser is by its nature normal to the surface of the laser chip. In FIG. 2 the surface emitting laser is shown to be an edge emitting laser with a micro mirror edge cut into the laser chip substrate. Other types of surface emitting lasers are possible without the use of a micro mirror. With the surface emitting laser diode the manufacturing process of the hybrid device requires only die bonding the laser chip on a photodetector and then bonding the photodetector to a supporting substrate. Wire connections to all the components can be performed at the same time on the same plane. As a result, the manufacturing process for a hybrid device using surface emitting lasers is considerably simpler than those using edge emitting lasers as described in U.S. Pat. No. 4,731,772. For the edge emitting laser, the device must be wire bonded in one plane, and then rotated for the remaining wire bonds. FIG. 3 shows the optical head from U.S. Pat. No. 4,731,772 which uses a hybrid device 68 and holographic lens 74 for the reading of information from an optical disc. It is the objective of this invention to disclose a method whereby the same ease of manufacturing can be applied to the edge emitting laser diode.

SUMMARY OF THE INVENTION

The present invention provides a semiconductor laser and a photodetector on a supporting substrate. The supporting substrate is inserted into a housing with a 45 degree mirror for the purpose of redirecting the light emitting through the edge of the laser to propagate along the optical axis of the hybrid device. A hologram lens is mounted at the output end of the hybrid device to diffract the returned beam to the photosensitive areas of the detector without returning through the mirror.

This patent discloses a design of the hybrid device which allows the mounting the edge emitting laser directly on the surface of a multiple element photodetector and the supporting substrate without the use of heatsink and without requiring the rotation of the heatsink for wire bonding. The supporting substrate is for the purpose of making electrical connections. The heat generated by the laser chip is also dissipated through the supporting substrate. Unlike the hybrid device as described in U.S. Pat. No. 4,731,772, the hologram is an integral part of the hybrid in this invention.

DESCRIPTION OF THE PREFERRED EMBODIMENT

Figure 1:
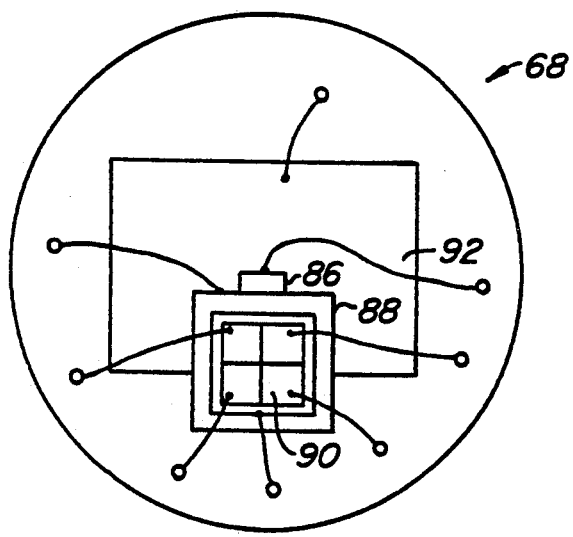
FIG. 1 is a diagram of a prior art hybrid device using an edge emitting laser diode.
Figure 2:
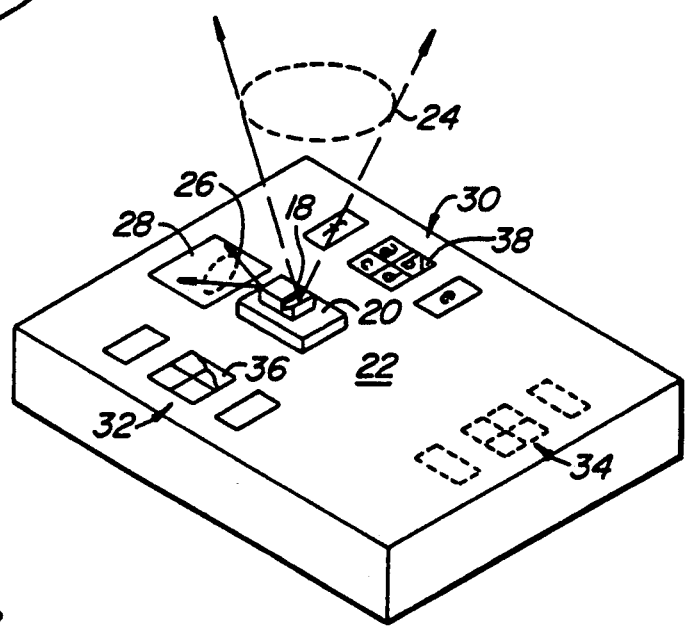
FIG. 2 is a diagram of a prior art hybrid device using a surface emitting laser diode.
Figure 3:
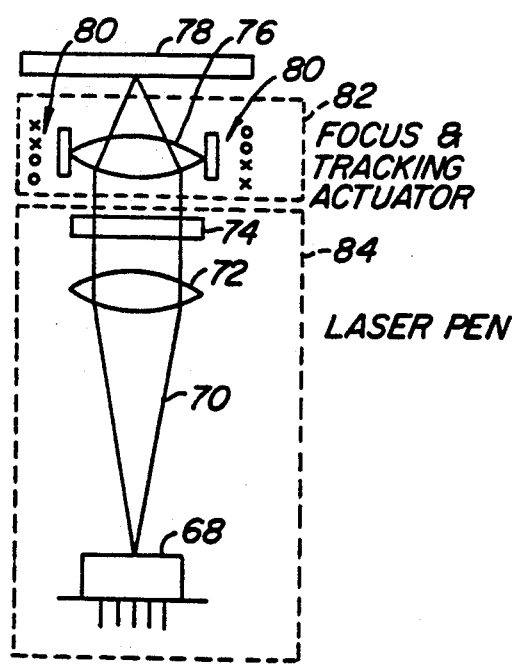
FIG. 3 is a diagram of a prior art optical head using a hybrid device of FIGS. 1 or 2 and holographic optical elements.
Figure 4A:
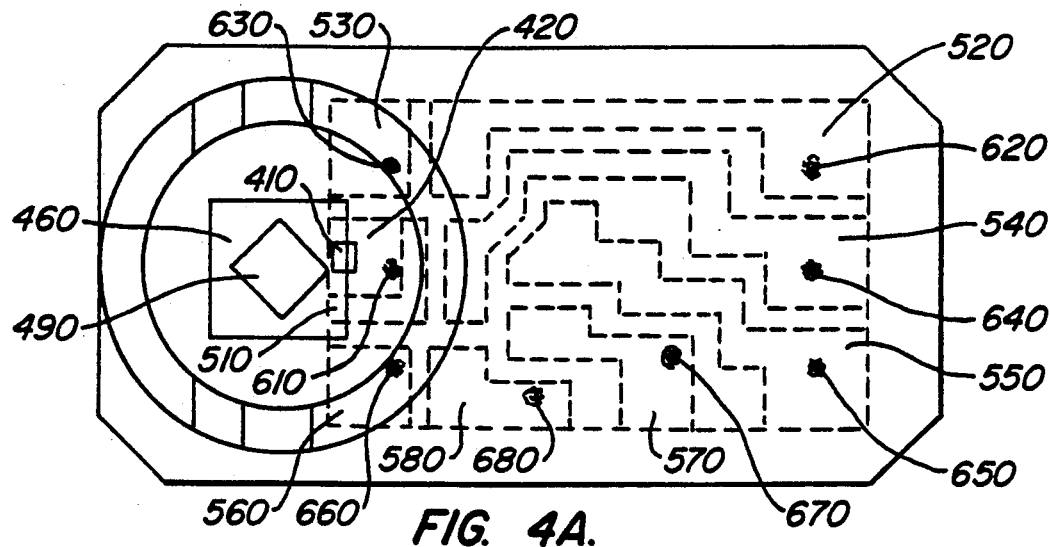
FIG. 4(a) is top view of a preferred embodiment of a hybrid device of the present invention.
Figure 4B:
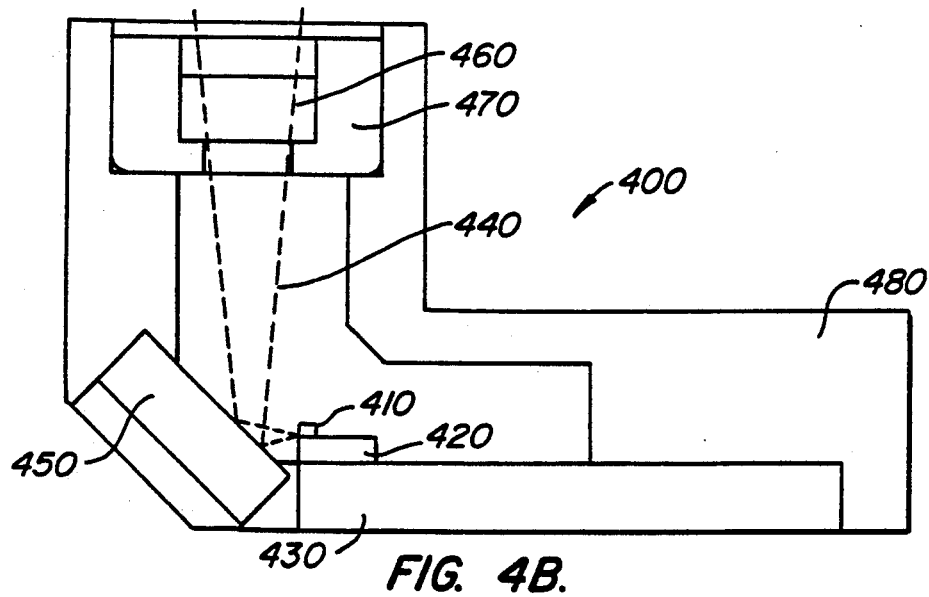
FIG. 4(b) is a side view of the hybrid device of FIG. 4(a).

FIG. 4(b) shows a side view of a hybrid device 400 of the present invention. A laser chip 410 is mounted on a photodetector chip 420 which is in turn mounted on a non-conducting substrate 430. The substrate gives mechanical support to the chips and also provides electrical connections for the hybrid device. The light beam 440 emitted by the laser chip is reflected by a mirror 450 to the propagate along the optical axis of a hologram lens 460 which is mounted inside a plastic housing 470 for the purpose of adjustment. The adjustment is done by rotating the hologram lens in the housing until the diffracted beam hits the photo-detector.

Figure 4C:
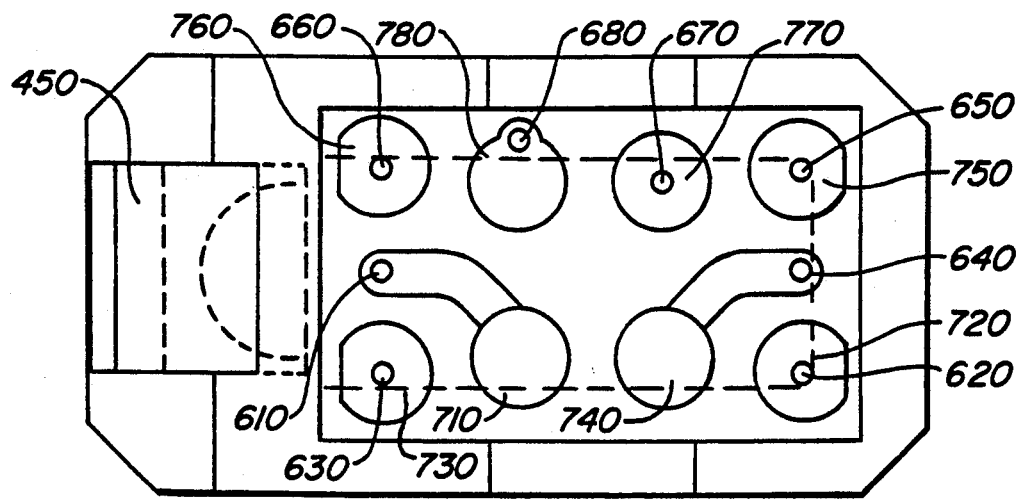
FIG. 4(c) is the bottom view of the hybrid device of FIG. 4(a).

The supporting substrate 430, hologram mount 470 and mirror 480 are contained inside a housing 480. The housing 480 has a cylindrical shape for the purpose of inserting into another mechanical structure and provides a mechanical reference for the optical axis of the hologram. FIGS. 4(a) shows the top view of the hybrid device of FIG. 4(b). The active area of the hologram lens 460 is shown as a square 490 located in the center of the hologram lens 460. This top view of the device also reveals a configuration of metalized pads on the supporting substrate for the purpose of providing electrical connections between the laser and the photodetector to the outside. The laser chip 410 and the photodetector chip 420 are attached to a bonding pad 510 with a through hole 610. In this case the cathode of the photodetector is electrically connected to pad 510. Wire bond pads 520–580 are for wire connections to the laser and the anodes of the photodetectors. Through holes 610–680 provide electrical continuity to the other side of the supporting substrate. FIG. 4c shows the bottom view of the device 400. The back side of the supporting substrate contains soldering pads 710–780. These soldering pads are connected to the wire bond pads via the through holes 610–680.

Figure 5:
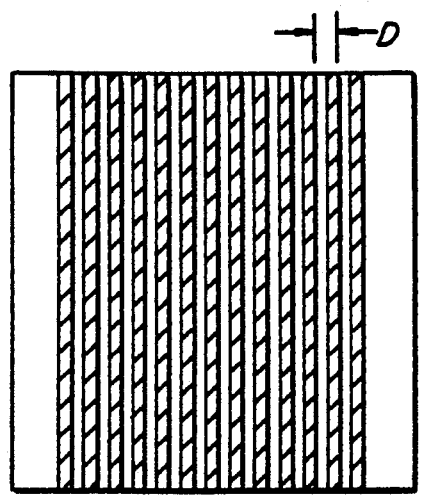
FIG. 5 is a diagram of the structure of a three beam grating.
Figure 6:
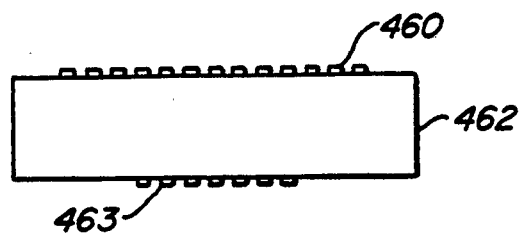
FIG. 6 is a diagram of the combination of a three beam grating and a hologram lens into one component.

In most compact disc plays available today the laser beam from the laser diode is divided into three beams for the purpose of measuring the tracking error. To implement this tracking concept into the hybrid device of this invention, the mirror 450 shown in FIG. 4b will contain line structures such as shown in FIG. 5. The diffraction caused by the structure divides the laser beam into three or more beams. The spacing "d" between a pair of the lines determines the angular separation among the beams. Another technique to implement the three beam tracking in this hybrid device is to record the hologram lens 460 on one side of the glass 462 and a three beam grating 463 on the other side of the glass 462 as shown in FIG. 6. The return beam is diffracted by hologram lens 460 to directly hit photodetector 420 without contacting mirror 450.

Figure 7:
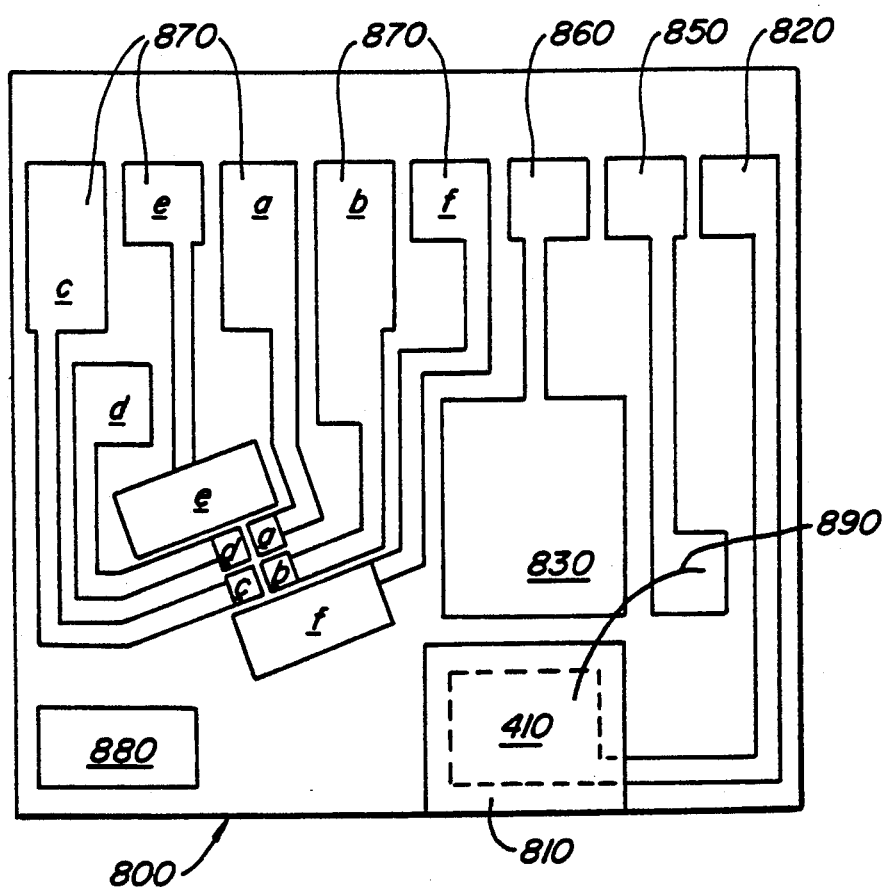
FIG. 7 is a diagram of one embodiment of a photodetector device for this invention.

FIG. 7 shows a preferred embodiment of the photodetector chip 800. A metal pad 810 is for the die bonding of the laser chip 410. Electrical contact for the bottom surface of the laser chip is provided by pad 820. A photosensitive area 830 located behind the back side of the laser chip will monitor the laser power emitted by the back surface of the laser chip. This provides the feedback signal to maintain the output power of the laser chip at a constant level regardless of the temperature during the operation of the device. Pad 860 is the bonding pad for the anode of the power monitor detector 830. Bonding pad 850 is electrically connected to the top surface of the laser chip by a wire 890. All the bonding pads 820, 850, 860, 870 a-f are located near the end of the photodetector chip 800 for easy connection by wire bonding to the supporting substrate. The cathode of the photodetector can be connected through the bottom of the chip or through the bonding pad 880 as shown in FIG. 7. Next to metal pad 810 are six photosensitive elements, a-f for sensing the returned beam diffracted by the hologram lens 460. Elements a-d provide the focus error signal and the high frequency signal which can be used to reproduce the recorded information. Elements e-f provide the tracking error signal. In some applications there is no need for three beam tracking. In this case, the tracking error signal can also be provided by the elements a-d.

Figure 8:
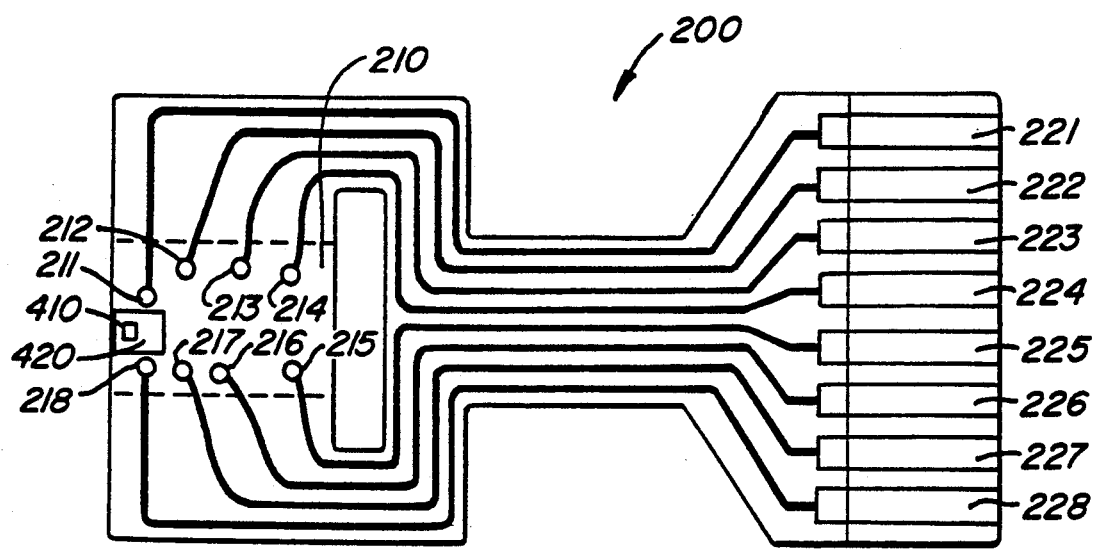
FIG. 8 is a diagram of an embodiment of a flexible printed circuit for providing the electrical connections for the hybrid of this invention.

FIG. 8 shows another embodiment for the support of the laser and photodetector chip. Instead of using electrical insulating material such as ceramic, a metal substrate can be used. In this case the electrical connections from the devices to the outside is provided by a flexible printed circuit board 200 as shown in FIG. 8. The laser chip 410 and photodetector chip 420 are die attached to a metal substrate 210 which has been affixed to a flexible printed circuit 200 with bonding pads 211–218. An insulating plastic strip with metal traces 221–228 is laid on top of metal substrate 210. The metal strips 221–228 are for making electrical connections by inserting into a connector. The use of a metal substrate has the advantage that it can dissipate the heat generated by the laser diode better than ceramic or other electrically nonconducting material. In optical recording where a high power laser is used, a metal substrate is much preferred over the ceramic substrate.

Figure 9:
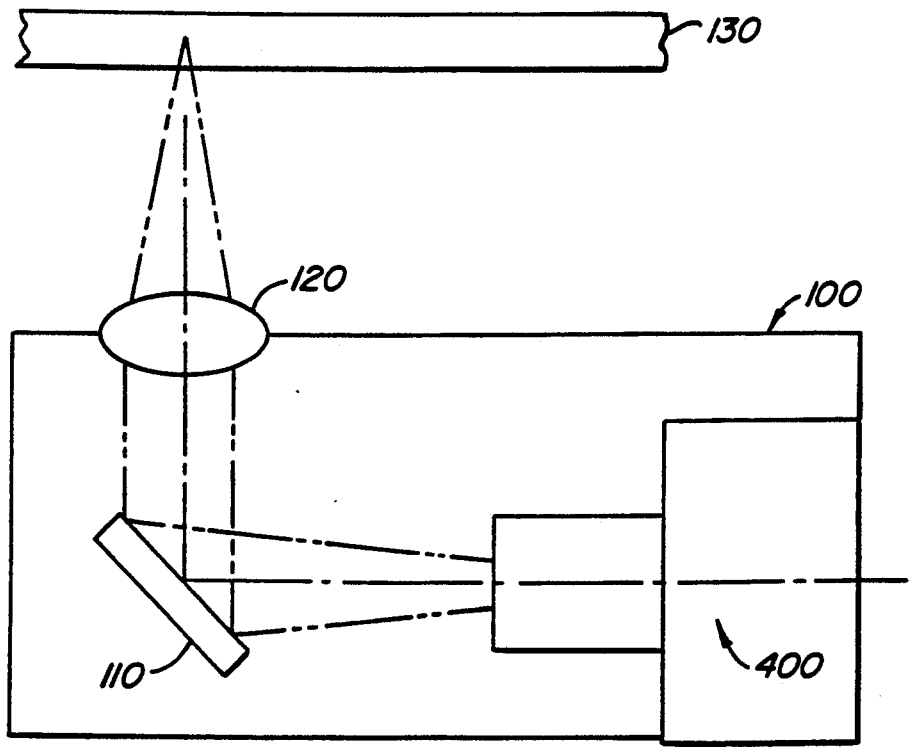
FIG. 9 is an embodiment of a thin optical system using the hybrid device of this invention.

FIG. 9 shows one embodiment of an optical system using this preferred embodiment of the present invention. The device 400 is mounted in a small housing 100 containing a focusing lens 120. The light beam emitted by the device 400 is redirected by a mirror 110 to propagate along the optical axis of the focusing lens 120. The laser beam is focused on a medium 130. The advantage of this optical system is the small size and light weight. In optical recording applications the optical system 100 containing the hybrid device 400 can be actuated to follow the motion of the optical medium.

Figure 10A:
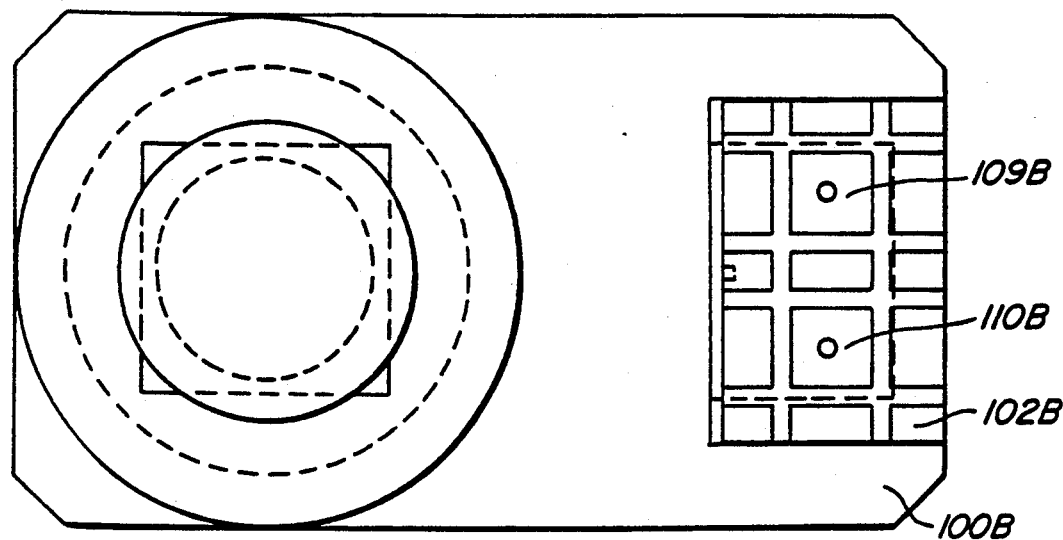
FIGS. 10A–10C are top, side, and bottom views of an alternate embodiment of a hybrid device according to this invention.
Figure 10B:
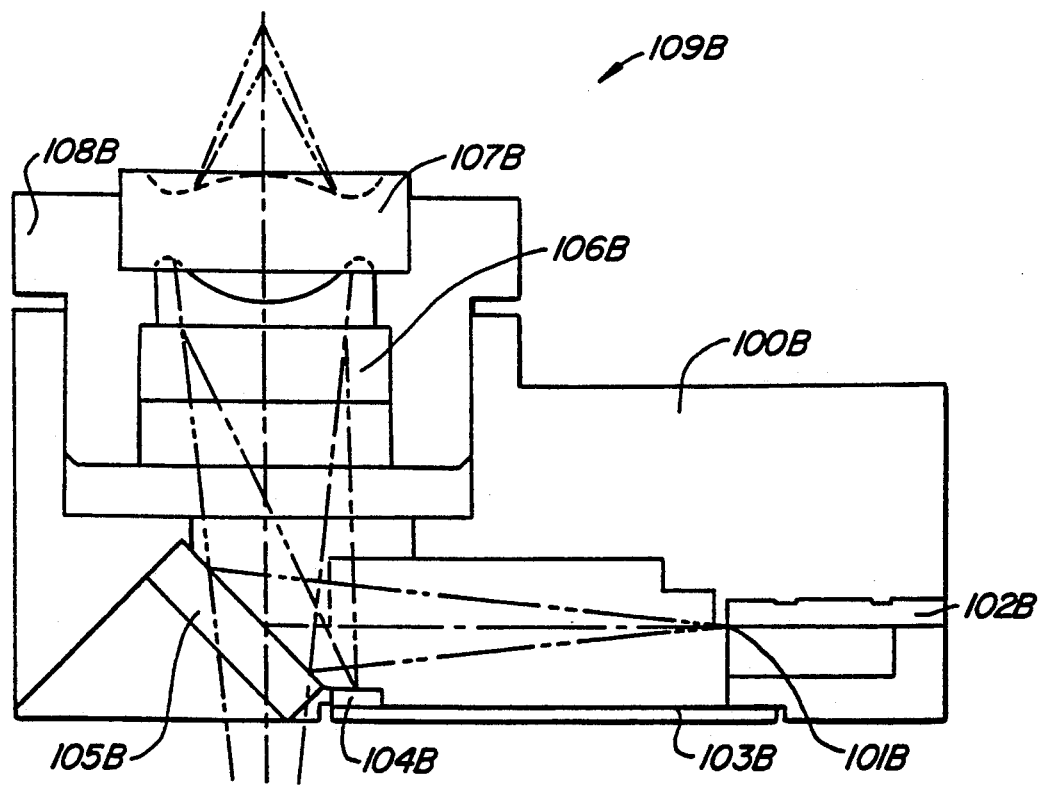
Figure 10C:
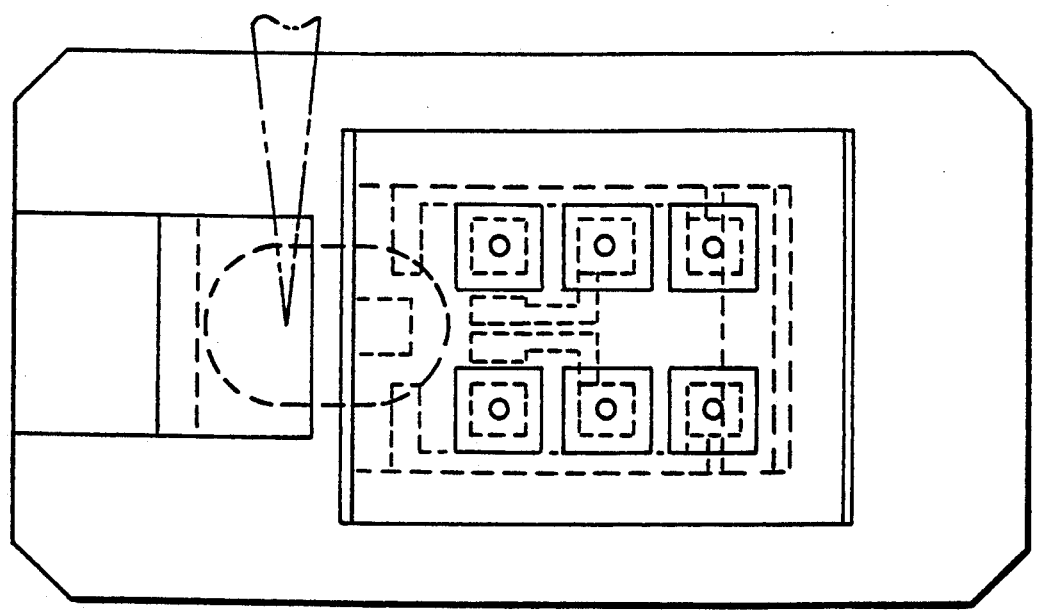

FIG. 9 shows a housing 100 holding together the hybrid 400, the objective lens 120, and a 45 degree mirror 110. FIGS. 10A–10C show another embodiment of the present invention which allows the mounting of the objective lens directly on the hybrid housing. FIG. 10B shows a side view of the this embodiment. A housing 100B holds all the components together. A laser diode chip 101B is mounted on a heatsink substrate 102B which is attached to a top surface of the housing 100B as shown in the top view of FIG. 10A. The light emitted by the laser diode chip 101B is reflected by the mirror 105B and passed through the hologram 106B and focused by the objective lens 107B to the top surface of the disk 109B. The hologram 106B and the lens 107B are both mounted in the same holder 108B. The light beam reflected off the surface of the disk passes through the objective lens 107B and is diffracted by the hologram 106B to the multiple elements detector 104B.

As shown in this embodiment the laser chip and the photodetector chip are mounted on separate substrates. This way, the photodetector chip can be mounted on a low cost substrate 103B with poor thermal conductivity. On the other hand, the substrate 102B for the laser chip must be of good thermal conductivity. In this embodiment, the lase chip 101B is located at a fixed distance from the objective lens as determined by the specifications of the lens. With this embodiment, the construction of the optical pickup for optical recording is then greatly simplified. Since the laser is separated from the detector, the laser chip 101B can also be replaced by a more conventional laser package.

FIG. 10A shows the soldering pads 109B and 110B for the laser diodes. FIG. 10C is a bottom view showing the bonding soldering pads for the photodetectors. In using this embodiment for optical recording, the module can be suspended by suspension wires to move the objective lens up and down to maintain perfect focus on the disk and at the same time move sideways to maintain perfect tracking.

As will be understood by those familiar with the art, the present invention may be embodied in other specific forms without the departing from the spirit or essential characteristics thereof. For example, the mirror may be mounted in other than a 45° angle. Accordingly, the disclosure of the preferred embodiment of the invention is intended to be illustrative, but not limiting, of the scope of the invention which is set forth in the following claims.

What is claimed is:

1. A hybrid laser and detector device for use in reading and/or writing on a media, said device comprising:
   a housing having an opening;
   a photodetector mounted in said housing;
   a semiconductor laser mounted in said housing proximate said photodetector, said semiconductor laser emitting a laser beam in a first direction away from said opening in said housing;
   a mirror mounted in said housing to redirect said laser beam along a second direction through said opening; and a diffraction grating, mounted in said opening, for diffracting a returned laser beam, reflected by said media, such that a diffracted laser beam is directed to said photodetector.

2. The device of claim 1 wherein said semiconductor laser is mounted directly on a photodetector chip, said photodetector comprising a plurality of light sensitive areas on said photodetector chip.

3. The device of claim 2 wherein said light sensitive areas comprise:
   first photosensitive area for monitoring the power of said semiconductor laser;
   at least a second photosensitive area for detecting data on said media; and
   at least a third photosensitive area for monitoring focusing errors between said device and said media.

4. The device of claim 1 wherein said mirror contains a diffraction grating for splitting said laser beam into three laser beams.

5. The device of claim 1 wherein said semiconductor laser and said photodetector are mounted on an electrically nonconducting substrate, said substrate comprising:
   a plurality of metal contacts on a first side for wire bonding to said semiconductor laser and said photodetector;
   a plurality of metal through holes for coupling said metal contacts with a second side of said substrate; and
   a plurality of soldering pads on said second side of said substrate, each of said soldering pads being connected to one of said through holes.

6. The device of claim 1 wherein said semiconductor laser and said photodetector are mounted on a flexible printed circuit, said flexible printed circuit comprising:
   a metal substrate, said photodetector being bonded to said metal substrate, said laser being mounted on said photodetector; and
   an insulating substrate extending over a portion of said metal substrate and having a plurality of metal traces for wire bonding to said semiconductor laser and said photodetector.

7. The device of claim 1 further comprising a second housing, said first-mentioned housing being mounted in said second housing, said second housing having a second opening with an objective lens mounted in said second opening, said laser beam being directed through said objective lens.

8. The device of claim 7 further comprising a second mirror, said second mirror being mounted in said second housing to redirect said laser beam from said first-mentioned housing to said objective lens.

9. The device of claim 1 wherein said diffraction grating is a hologram lens.

10. A hybrid laser and detector device for use in reading and/or writing on a media, said device comprising:
    a housing having an opening;
    a photodetector mounted in said housing;
    a semiconductor laser mounted in said housing proximate said photodetector, said semiconductor laser emitting a laser beam in a first direction away from said opening in said housing;
    a mirror mounted in said housing to redirect said laser beam along a second direction through said opening, said mirror having a first diffraction grating for splitting said laser beam into three laser beams; and
    a second diffraction grating, mounted in said opening, for diffracting a returned laser beam, reflected by said media, such that a diffracted laser beam is directed to said photodetector.

11. The device of claim 10 further comprising first and second substrates, said photodetector being mounted on said first substrate and said semiconductor laser being mounted on said second substrate, said first substrate being mounted in said housing between said semiconductor laser and said mirror.

* * * * *